United States Patent [19]

Reitze

[11] Patent Number: 5,673,838
[45] Date of Patent: Oct. 7, 1997

[54] STAPLE DISPENSING DEVICE

[76] Inventor: Frederick Reitze, 2659 W. Arthur Ave., Chicago, Ill. 60645

[21] Appl. No.: 547,934

[22] Filed: Oct. 25, 1995

[51] Int. Cl.$^6$ .............................. B25C 5/02; B25C 5/16
[52] U.S. Cl. ........................ 227/119; 227/120; 227/155
[58] Field of Search ............................ 227/109, 119, 227/120, 129, 155, 156

[56] References Cited

U.S. PATENT DOCUMENTS

| 330,444 | 11/1885 | Van Reyper | 411/475 |
|---|---|---|---|
| 3,368,445 | 2/1968 | Trzesniewski | 411/457 |
| 4,189,082 | 2/1980 | Solomon | 227/109 |
| 4,201,314 | 5/1980 | Samuels et al. | 227/120 X |
| 4,225,075 | 9/1980 | Chi | 227/120 X |
| 4,369,909 | 1/1983 | Grzeika | 227/109 |
| 4,699,307 | 10/1987 | Kozyrski et al. | 227/109 X |
| 4,718,803 | 1/1988 | Reitze | 227/155 X |
| 4,830,257 | 5/1989 | Lin | 227/156 X |

*Primary Examiner*—Joseph J. Hail, III
*Assistant Examiner*—Jay A. Stelacone

[57] ABSTRACT

A device for storing and dispensing an array of staples is particularly adapted for dispensing staples having a non-linear bight and two spaced-apart legs depending therefrom, and material weakening nicks in the regions of the bight adjacent the legs. When the staple is dispensed from the device, the legs are bent into a plane approximately parallel to the plane of the bight. When it is desired to remove the staple, the bight is gripped and rotated until it breaks away from the legs.

3 Claims, 6 Drawing Sheets

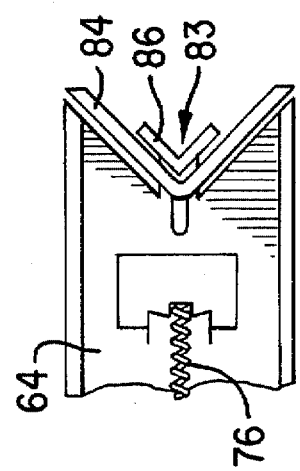
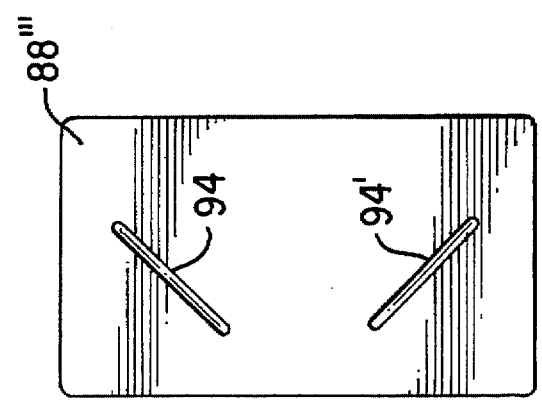
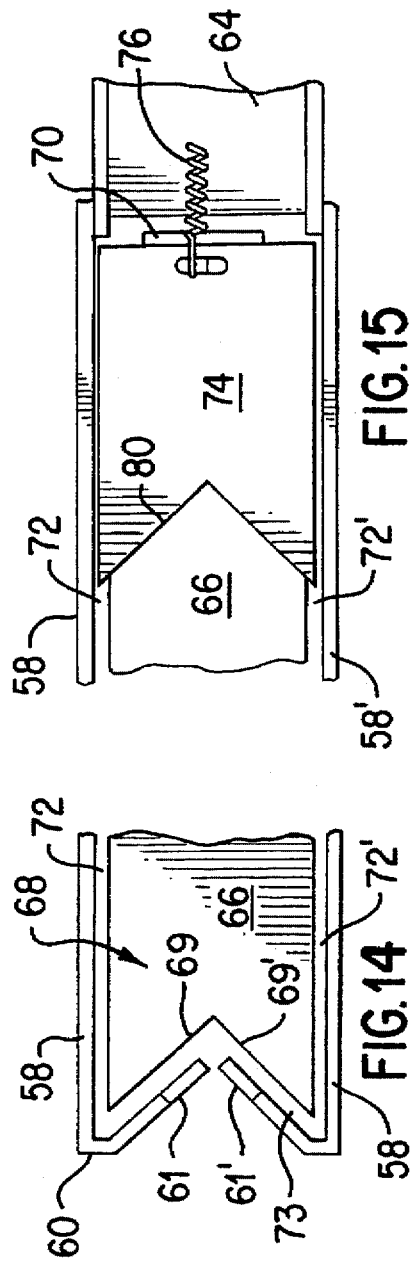
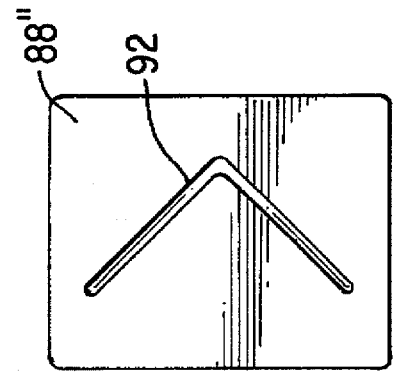
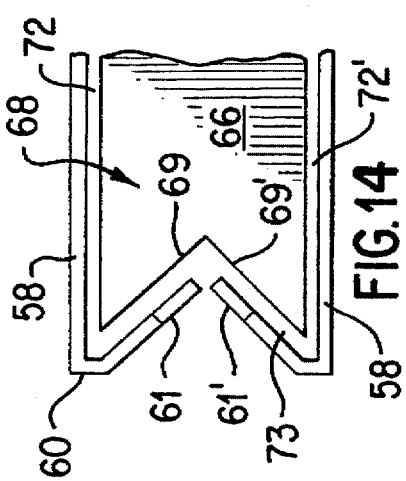
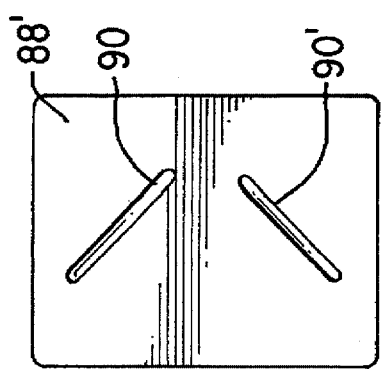

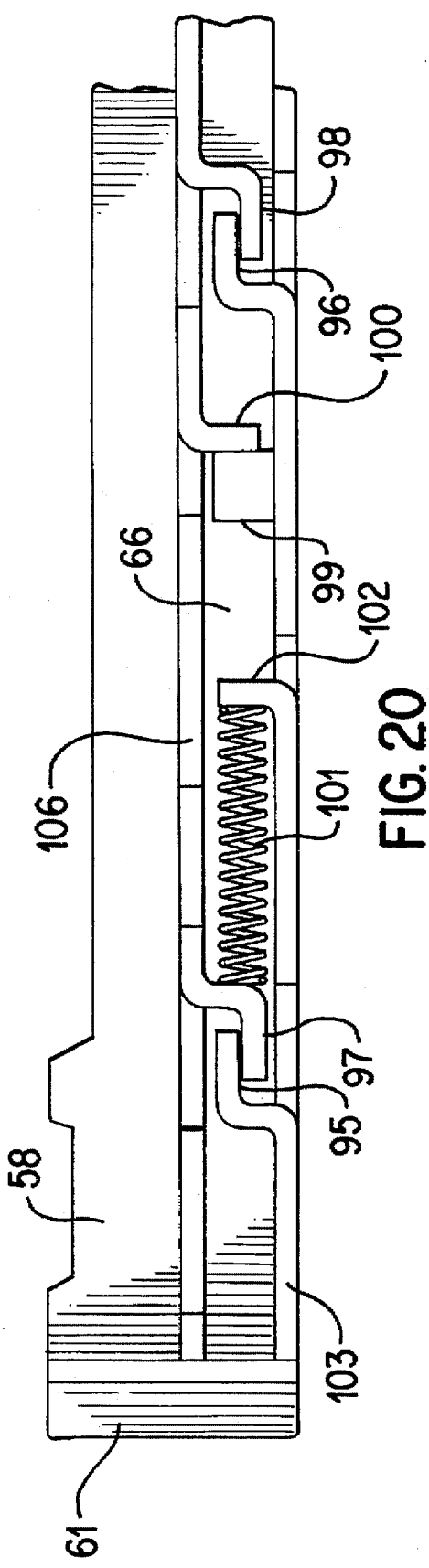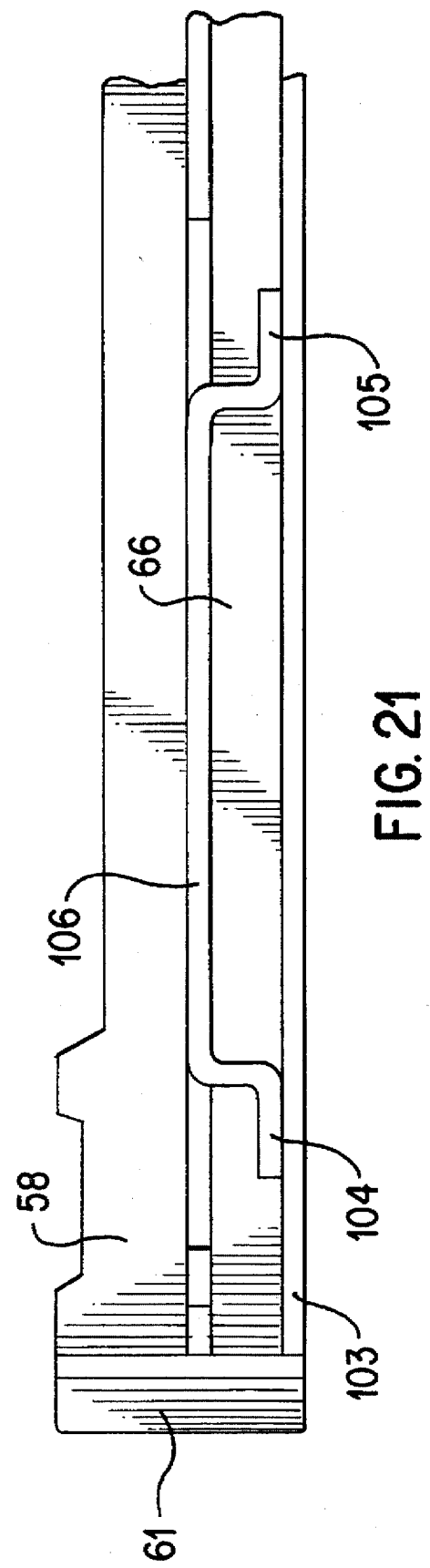

5,673,838

STAPLE DISPENSING DEVICE

BACKGROUND OF THE INVENTION

Staples are commonly used as a semi-permanent means to interconnect two or more pieces of paper. When it is necessary to remove the staple, generally a tool is used which automatically draws the bight part of the staple away from the paper and thereby withdraws the legs. This is cumbersome, messy and often destructive of the paper being held together. A solution to this problem is described by Reitze in U.S. Pat. No. 4,718,803 which describes a frangible staple which can be gripped manually and easily removed from the paper. Although this patent describes a staple which permits the easy removal of the staple without a tool, this patent does not describe an improved staple dispensing device for applying frangible staples to the paper. In accordance with the present invention, disclosed is an improved staple that is readily removable without the use of a tool, and a staple dispensing device which facilitates the application of these novel staples.

SUMMARY OF THE INVENTION

It is an important object of the present invention to provide a staple which is readily removable without the use of tools.

In an embodiment of the present invention, there is provided a frangible staple for fastening together a plurality of sheets or the like, comprising a non-linear bight, two spaced-apart legs depending therefrom, and a pair of material-weakening means respectively in the bight in the regions thereof adjacent to the legs.

In another embodiment of the present invention, there is provided a stapling machine comprising a magazine for storing an array of staples, said magazine having an upper portion with a hammer means for driving staples from the array and a lower portion pivotally connected to said upper portion with a means for transporting the staples and means for dispensing the staples from the array; said transporting means further comprising an elongated carriage having a first end, a second end and lateral edge portions; the first end of said carriage having a nonlinear end; sidewalls disposed adjacent and spaced apart from lateral edge portions; said dispensing means further comprising a nonlinear endwall disposed adjacent and spaced apart from the nonlinear end of said carriage a distance sufficient to permit the dispensing of a staple from the array; and a means for biasing said array of staple toward said dispensing means.

BRIEF DESCRIPTION OF THE DRAWINGS

For the purpose of facilitating an understanding of the invention, them is illustrated in the accompanying drawings, preferred embodiments thereof, from an inspection of which, when considered in connection with the following description, the invention, its construction, and operation, and many of its advantages should be readily understood and appreciated.

FIG. 14 is an enlarged fragmentary view of the staple carriage first end portion;

FIG. 15 is an enlarged fragmentary view of the staple carriage second end portion;

FIG. 16 is an enlarged fragmentary view of the upper staple magazine portion;

FIG. 17 is a plan view of an anvil used to form the staple legs shown in FIG. 1;

FIG. 18 is a plan view of an anvil in one alternate embodiment of the present invention;

FIG. 19 is a plan view of an anvil in another alternate embodiment of the present invention.

FIG. 20 is an enlarged view of the carriage and magazine taken along line 20 in FIG. 13.

FIG. 21, taken along line 20 in FIG. 13, shows an alternate method of supporting the carriage 66 in the magazine 58.

DESCRIPTION OF THE PREFERRED EMBODIMENTS

Figure 1:
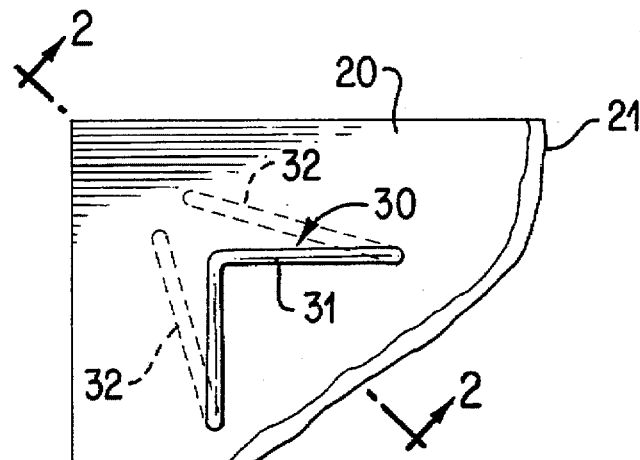
FIG. 1 is a fragmentary view of two sheets of paper held together by a frangible staple incorporating the features of the present invention.
Figure 2:
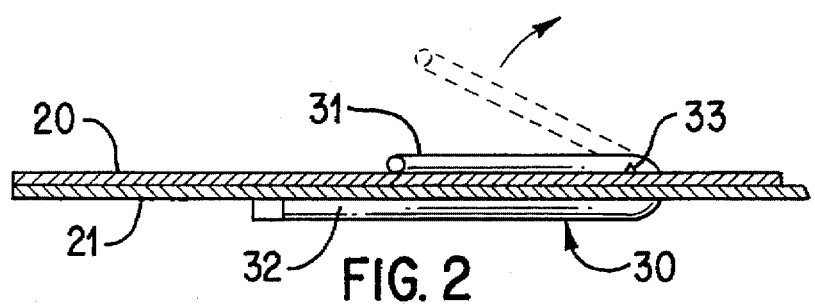
FIG. 2 is a sectional view along the line 2—2 of FIG. 1, on a slightly enlarged scale, showing how the staple is removed.
Figure 3:
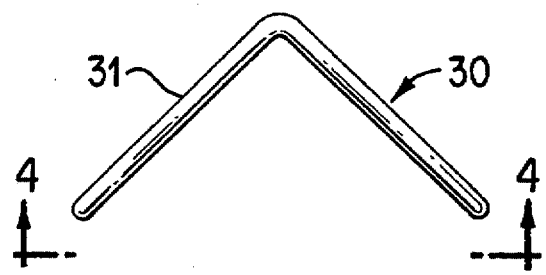
FIG. 3 is a plan view of the staple prior to application to the papers.
Figure 4:
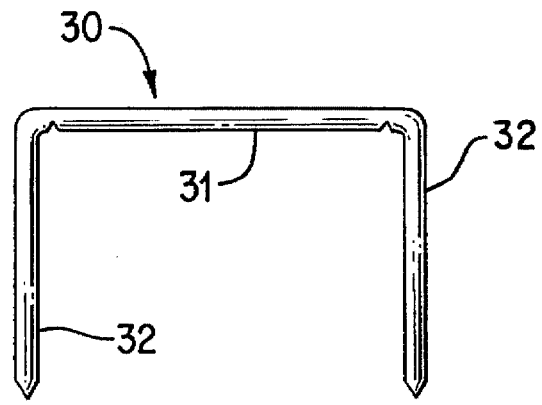
FIG. 4 is an end elevational view along the line 4—4 of FIG. 3.
Figure 5:
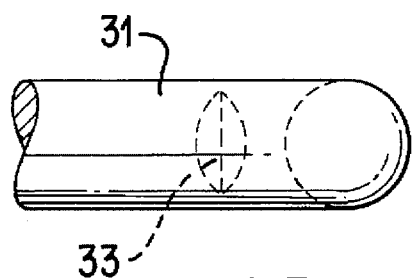
FIG. 5 is an enlarged fragmentary view of one end of the bight showing a nick therein.
Figure 6:
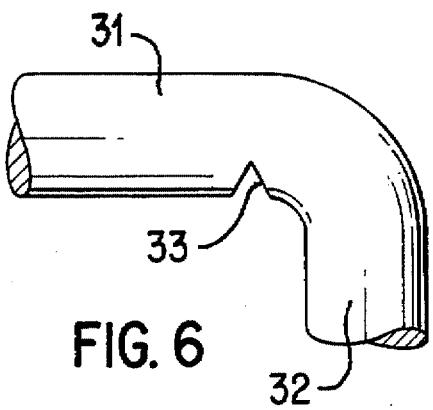
FIG. 6 is a fragmentary elevational view of the end depicted in FIG. 5.

Referring now to FIGS. 1 and 2, there is depicted two sheets of paper 20 and 21 held together by a staple 30 incorporating the features of the present invention. The staple 30 comprises a shallow V-shaped bight 31 and a pair of legs 32. The bight 31 lies in a plane substantially parallel to the planes of the sheets 20 and 21. The plane of the legs 32, in the position shown in FIGS. 1 and 2, is also substantially parallel to the planes of the sheets 20 and 21. The staple 30 further comprises a pair of material weakening means preferably consisting of a pair of notches or nicks 33 in the bight 31 in the regions thereof adjacent to the legs 32.

When it is desired to remove the staple 30, one slips his fingernail under the pointed part of the bight 31, which he grasps. He then rotates the bight 31 in the direction of the arrow in FIG. 2, causing the bight 31 to break away from the legs 32 at the nicks 33. The legs 32 will readily fall out, so that the staple has been removed without the use of a tool.

In the preferred embodiment, the legs 32 are sufficiently long so that their ends nearly touch when applied to the papers 20 and 21, as shown in FIG. 1. The greater the number of papers held together, the shorter the legs 32 in a plane parallel to the papers. With the staple 30 applied to just a few pieces of paper, such as shown in FIG. 1, it would be necessary to hold the corners of the papers and also the ends of the legs 32 with the index finger and the thumb of one hand, so that the legs do not pull through and tear the papers when the bight 32 is bent upwardly. When the pile of papers is thicker still, removal will be successful even though only the corners of the papers are held in the first hand.

FIGS. 3 to 6 depict the staple in its undeformed condition, that is, prior to being applied to the sheets 20 and 21. In such condition, the legs 32 are parallel and lie in a plane perpendicular to the plane of the bight 31.

While the staple 30 is shown to have a V-shape, it is to be understood that any non-linear shape providing a grasping portion would be satisfactory. For example, the bight could be U-shaped or the V could be clipped off.

Figure 7:
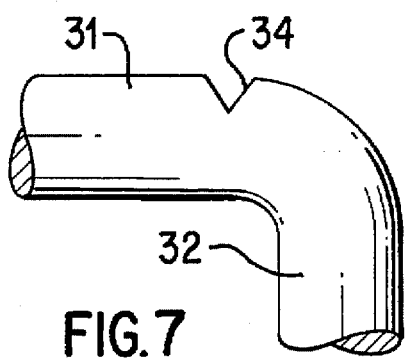
FIG. 7 is a view like FIG. 6, depicting an alternative embodiment.
Figure 8:
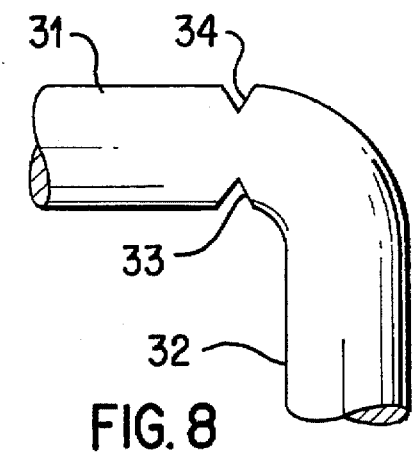
FIG. 8 is a view like FIG. 6, depicting yet a third alternative embodiment.

FIG. 7 depicts an alternative form, wherein the nicks 34 are located on the top of the bight 31, that is, the surface away from the legs 32. In FIG. 8, a nick 34 is provided on each end of the top side of the bight 31, that is, the surface away from the legs 32; and a nick 33 is provided on each end of the underside of the bight 31.

The staple 30 may be made from a long piece of wire fed to a forming machine in which short pieces of approximate length are cut off and formed into individual staples. The wise may have any suitable cross section; it may be round, square or rectangular. In the embodiments shown, the staple 30 has a round cross section. The end of the legs 32 may be chisel shaped as shown.

Figure 10:
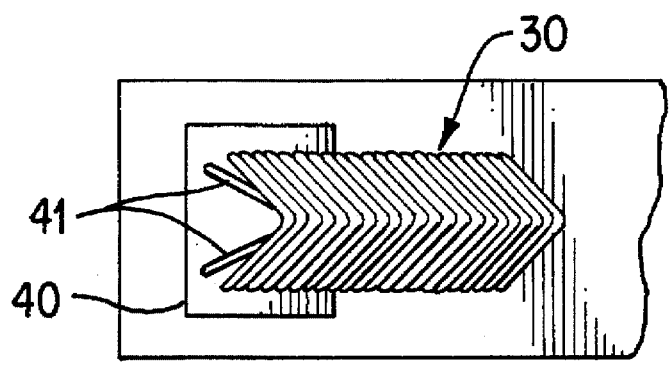
FIG. 10 depicts a gang of staples as it would be mounted in a stapling machine.

For use in stapling machines, staples are usually secured together in multiple form, as in the gang illustrated in FIG. 10. Such a gang can be formed by placing a plurality of staples 30 side by side, in parallel relation, and then securing them to each other with a securing means such as adhesive.

Figure 9:
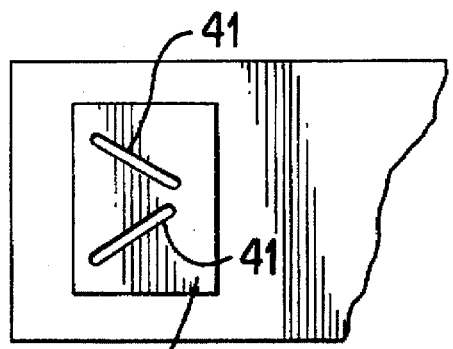
FIG. 9 depicts an anvil used to form the staple legs into the position shown in FIG. 1.

FIG. 9 depicts an anvil 40 of a stapling machine having grooves 41 that converge. As is common practice, the sheets 20 and 21 to be held together are placed between the anvil 40 and the stapling machine carriage that carries the gang of staples depicted in FIG. 10. A hammer drives the forward most staple 30 downwardly through the sheets until it strikes the grooves 41 in the anvil 40. The legs 32 are caused simultaneously to be bent to the position shown in FIGS. 1 and 2, whereupon the sheets 20 and 21 are stapled together. The next staple is automatically advanced so that it can be driven the next time the hammer is operated.

While the staple 30 is being driven into the sheets 20 and 21, the force is fairly evenly applied to the bight 31 and the tops of the legs 32 so that fracture at the nicks 33 and/or 34 does not occur. However, when it is desired to remove the staple in the manner described above, the bight 31 will break away from the legs 32.

Figure 11:
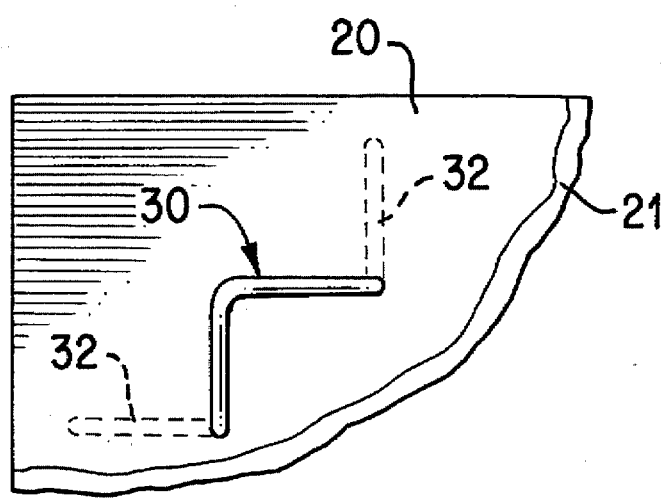
FIG. 11 depicts a modification of the applied staple, wherein the free ends of the legs diverge when applied.

In FIG. 11, the legs 32 of the staple 30, when bent into a plane parallel to the plane of the sheets 20 and 21 are respectively perpendicular to the two parts of the bight 31. The anvil for such purpose would have grooves similarly oriented. In removing the staple depicted in FIG. 11, one would hold the legs 32 down by placing two fingers of one hand on the top paper 20 and rotate the bight 31 with the other hand.

Although the staple 30 is preferably used with a stapling machine having an anvil, it may be used in devices that do not make use of an anvil. In the latter situation, the legs would not be bent during the application. When application is complete, the legs would remain at right angles to the plane of the bight 31. An illustration of this application is the attachment of papers to bulletin boards or the like.

Figure 12:
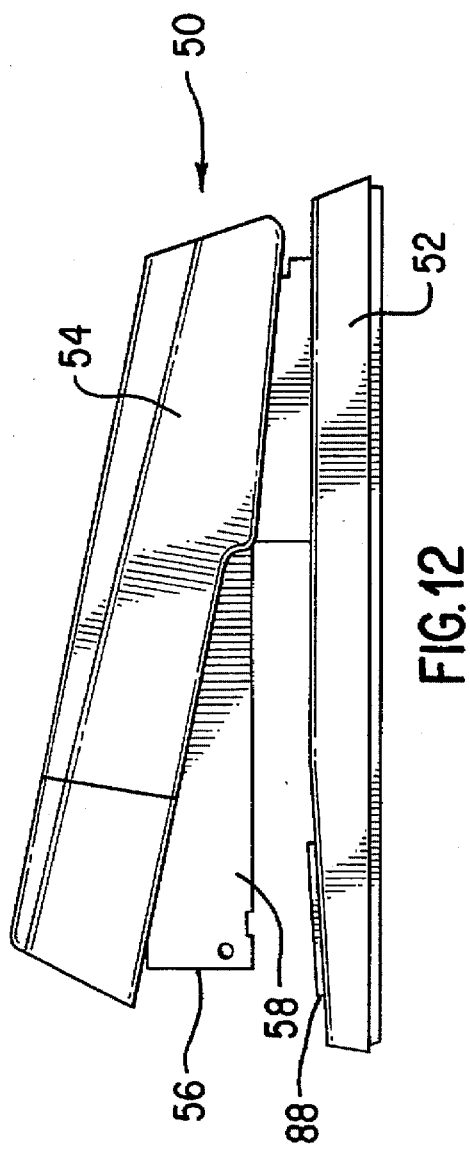
FIG. 12 is an elevational view of the stapling machine in accordance with the present invention.
Figure 13:
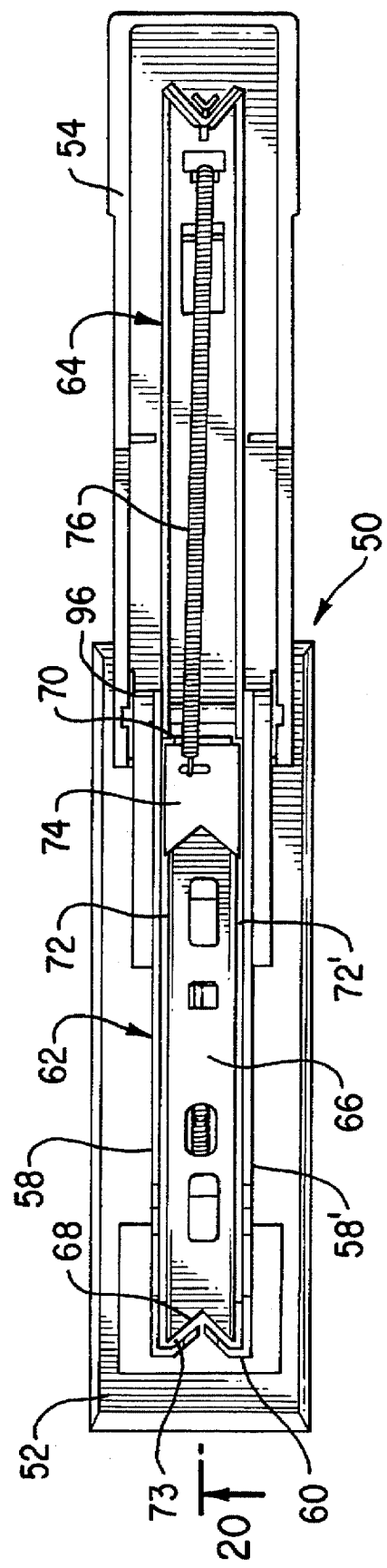
FIG. 13 is a plan view of the stapling machine shown in FIG. 12 in an open position.

The preferred stapling machine of the present invention is shown at 50 in FIGS. 12 and 13. The stapling machine 50 comprises a base member 52 for optionally supporting the device on a flat surface and for dispensing slot 73, and a movable arm 54 hingedly connected to the base 52 and having the staple magazine 56 nested within it. Stapling machines of this general configuration, without specific modifications disclosed herein, are well-known in the art.

The staple magazine 56 of the present invention is more clearly shown in FIG. 13. As shown in this opened view, the magazine 56 comprises an upper portion 64 pivotally connected to a lower or bottom portion 62. The bottom portion 62 of the magazine is adapted to store and transport a gang of staples. In particular, the bottom portion of the magazine 62 comprises an elongated plate or carriage 66 for carrying the staples. In the most preferred embodiment, this carriage 66 has a generally flat upper surface. The carriage 66 terminated in a fast end 68 disposed at the front end of the movable arm 54, and adjacent to a second end 70 disposed at the back portion of the movable arm which is hingedly connected to the base member 52 at hinge portion 96.

Disposed adjacent the first end 68 of the carriage 66 is a magazine endwall 60 having two generally parallel sidewalls 58 and 58' depending therefrom and extending longitudinally toward the hinge portion 96 of the magazine lower portion 62 to form a storage chamber for the gang of staples. The sidewalls 58 and 58' depending therefrom and extending longitudinally toward the hinge portion 96 of the magazine lower portion 62 to form a storage chamber for the gang of staples. The sidewalls 58 and 58' are spaced apart from the lateral edges of the elongated carriage 66 to form slots 72 and 72' which is adapted to permit a single staple to be dispensed from the magazine when the stapling machine is activated.

Disposed on carriage 66 is reciprocating member 74 which is slidably mounted on the upper surface of the elongated track. The reciprocating member 74 is connected to a biasing means 76 which provides tension on the gang of staples and facilitates their transport along the carriage 66 toward the dispensing slot 73. In a preferred embodiment of the present invention, the biasing means 76 is a spring which is secured to the reciprocating member 74 at one end and to the upper portion 64 of the magazine at its other end. In operation, the spring 76 is stretched as the upper portion 64 of the magazine is closed as shown in FIG. 13, and relaxed as the magazine is closed such that the upper portion 64 nests within the lower portion 62 of the magazine.

FIG. 14 shows a detailed view of the staple dispensing portion of the staple machine in accordance with a preferred embodiment of the present invention. In this embodiment, the first end 68 of the carriage 66 is nonlinear and has two end regions 69 and 69' which extend inwardly toward the center of the carriage 66 preferably in a V-shape. The endwall terminal portions 61 and 61' of the magazine endwall 60 also extend inwardly toward the center of the carriage in a nonlinear fashion such that the cooperation of the endwall terminal portions 61 and 61' with the end portions 69 and 69' of the carriage form a slot 73 for dispensing staples. Unlike conventional stapling machines having a linear endwall of the carriage, the nonlinear end 68 of the carriage 66 in the present invention is specifically adapted to dispense staples having a nonlinear bight portion. The complementary shape of the end 68 of the carriage and the endwall 60 of the magazine provide an excellent slide portion from which the staples can be dispensed.

At the opposite end of the carriage 66 is the reciprocating member 74 as shown in FIG. 15. Although this particular drawing depicts the stapling machine when the magazine 56 is in the open position having the biasing means 76 under tension, it is readily understood that the reciprocating member 74 is slidably positioned along the carriage toward the staple dispensing slot 73 as the tension on the biasing means is relaxed. In the preferred embodiment of the present invention, the first end 80 of the reciprocating member 74 has a nonlinear V-shape complementary to the first end 68 of the carriage and consequently complementing in shape to the shape of the staple. In this embodiment, the shape accommodates staples having a nonlinear bight portion. The second end of the reciprocating member 74 is generally linear, but can assume any convenient shape.

The terminal end 83 of the upper portion 64 of the magazine is shown in FIG. 16. Disposed on the outermost end of the magazine is a hammer 84 which is used to drive the staples through the staple dispensing slot 73 when the movable arm 54 is actuated. Accordingly, the shape of the hammer in the preferred embodiment of the present invention is complementary to the staple dispensing slot 73. When the staple dispensing slot 73 is V-shaped, then the hammer 84 is preferably V-shaped. A guide and stop means 86 is disposed adjacent the hammer 84 to prevent the upper portion 64 of the magazine 56 from traveling lower than necessary when dispensing staples. This guide and stop means 86 also aligns the upper 64 and lower 62 portions of the magazine 56 as the hammer 84 descends.

FIGS. 17–19 depict various alternate embodiments of the anvil 88', 88" or 88'" in accordance with the present invention. The grooves disposed in the anvil can be convergent as shown by grooves 90 and 90' in FIG. 17, continuous as shown by groove 92 in FIG. 18 or divergent as shown by grooves 94 and 94' in FIG. 19. In the preferred embodiment of the present invention, the grooves 90 and 90 are disposed at an angle which lies in the same vertical planes as the end portions 69 and 69' of the endwall 68 adjacent the lateral edges of the carriage.

FIG. 20 is an enlarged view of only the carriage and magazine taken along line 20 in FIG. 13. This view shows one method by which the carriage 66 may be supported in the magazine 58. Tabs 95 and 96 may be formed by cutting out and bending upward two small projections from the bottom wall 103 of the magazine. Tabs 97 and 98 may be formed by cutting out and bending downward two small projections from the top wall 106 of the carriage 66. Tab 99 may be formed by cutting out and bending upward a small rectangular projection from the bottom wall 103 of the magazine. Tab 100 may be formed by cutting and bending downward a small projection from the upper wall 106 of the carriage. Tab 102 may be formed from the bottom wall of the magazine. When the carriage is in proper position with relation to the magazine as illustrated, tab 100 butts against tab 99, tab 97 hooks under tab 95, and tab 98 hooks under tab 96. The carriage is kept firmly in this position by spring 101 which keeps the carriage pushed forward so that tab 100 butts against tab 99.

FIG. 21 shows an alternate method of supporting the carriage in the magazine 58. The view in FIG. 21 is taken along line 20 in FIG. 13, but illustrates the following alternate structures. Tabs 104 and 105 have been formed by cutting and bending downward two small projections from the top wall 106 of the carriage 66. These two tabs are welded to the bottom wall 103 of the magazine 58 to support the carriage 66 in its correct position in the magazine 58.

The present invention has been described in detail and with specific reference to its preferred embodiments, however, it will be understood by those skilled in the art that modifications can be made thereto without departing from the spirit and scope thereof.

I claim:

1. A stapling machine comprising a magazine for storing an array of staples, said magazine having an upper portion with a hammer means for driving staples from the array and a lower portion pivotally connected to said upper portion with a means for transporting the staples and means for dispensing the staples from the array;

said transporting means comprising an elongated carriage having a first end, a second end and lateral edges; the first end of said carriage is V-shaped having end regions extending inwardly toward a center portion of the carriage, said transporting means further comprising sidewalls disposed adjacent said lateral edges and spaced apart from said lateral edges to form slots;

said dispensing means comprising a V-shaped endwall disposed adjacent and spaced apart from the V-shaped end of said carriage a distance sufficient to dispense staples from the array; and a means for biasing said array of staples toward said dispensing means, said biasing means comprising a sliding member having a V-shaped end, said V-shaped end being complementary in shape to said first end of the carriage.

2. The staple machine of claim 1 in combination with a frangible staple, said frangible staple comprising a non-linear bight lying in a first plane, said non-linear bight having two substantially parallel spaced-apart legs depending from said bight, said legs being disposed in a second plane which is substantially perpendicular to said first plane; a pair of material weakening nicks disposed in said bight adjacent said legs, such that said bight is easily grasped, broken and separated from said legs by rotation.

3. The staple machine of claim 1 further comprising a base member having an anvil and a movable arm pivotally connected to said base member.

* * * * *